May 20, 1958  R. C. SCOTT  2,835,127
HARDNESS TESTER
Filed March 3, 1954  7 Sheets-Sheet 1
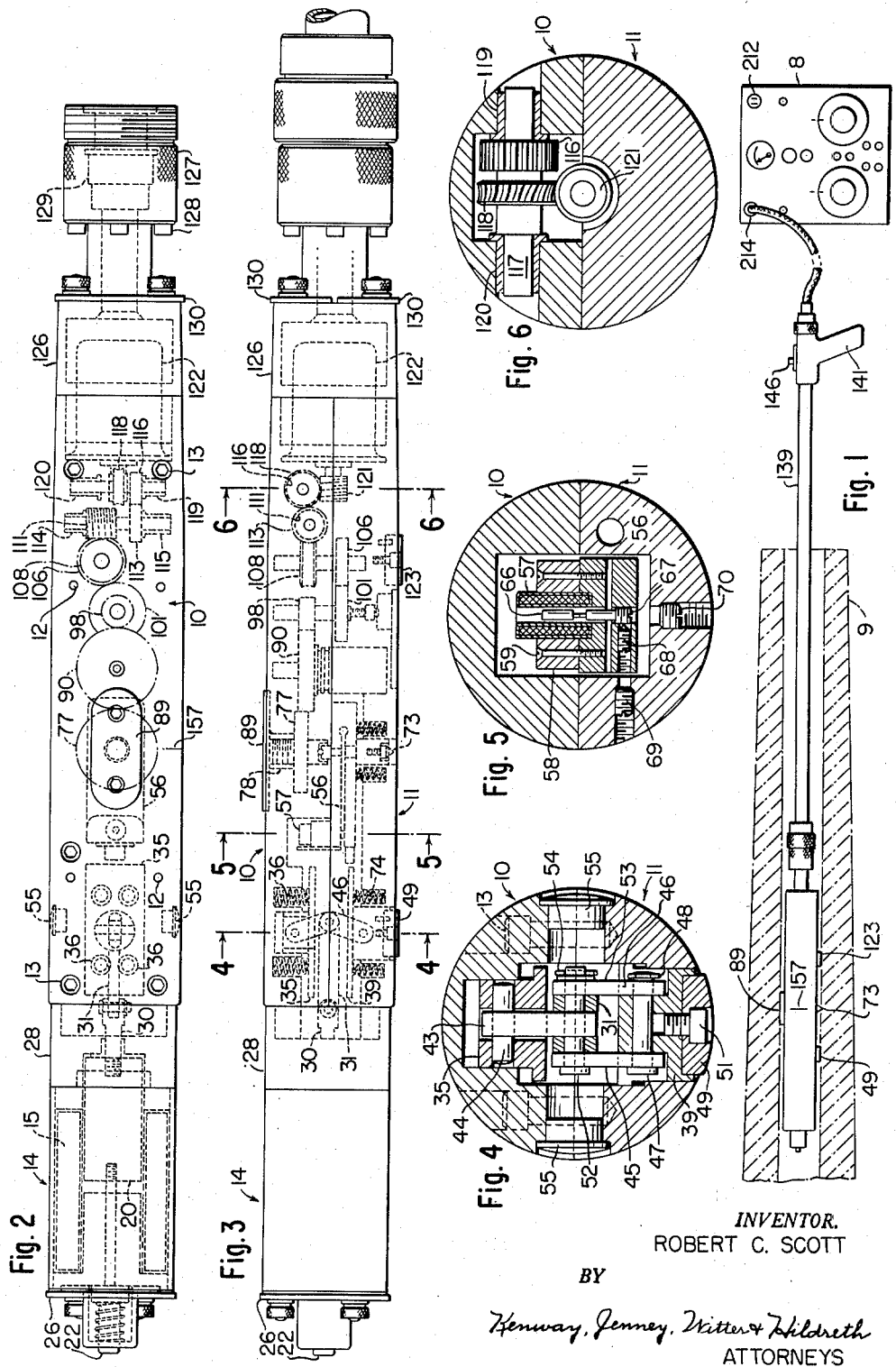
INVENTOR.
ROBERT C. SCOTT
BY
Kenway, Jenney, Witter & Hildreth
ATTORNEYS May 20, 1958 R. C. SCOTT 2,835,127
HARDNESS TESTER
Filed March 3, 1954 7 Sheets-Sheet 2
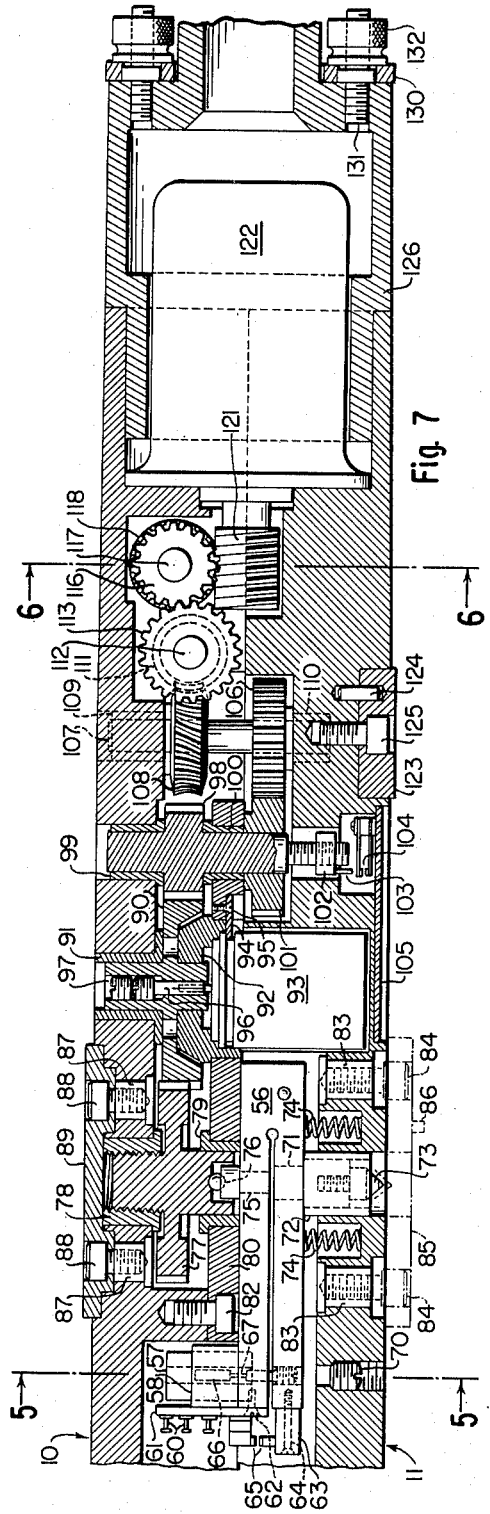
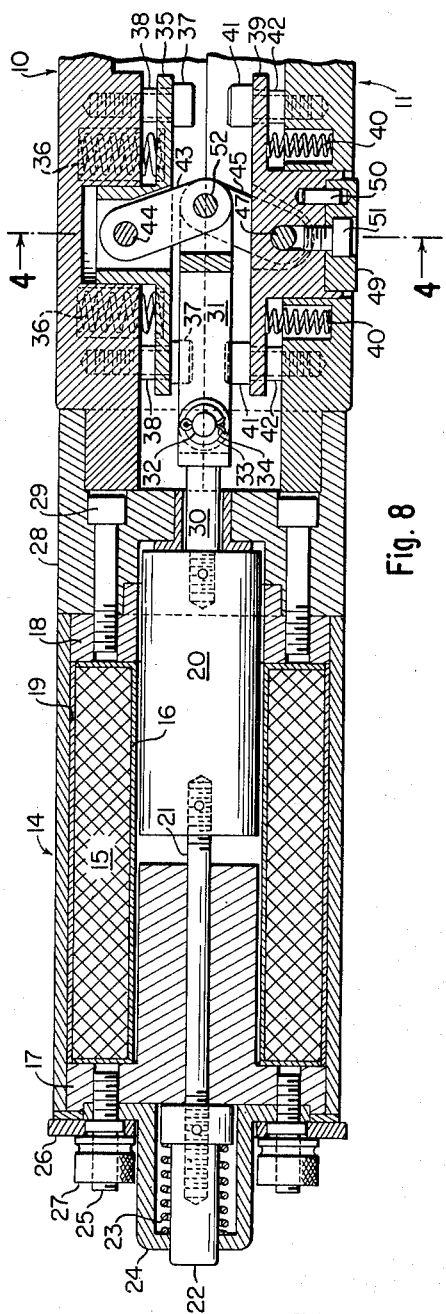
INVENTOR.
ROBERT C. SCOTT
BY
Kenway, Jenney, Witter & Hildreth
ATTORNEYS May 20, 1958
R. C. SCOTT
2,835,127
HARDNESS TESTER
Filed March 3, 1954
7 Sheets-Sheet 3
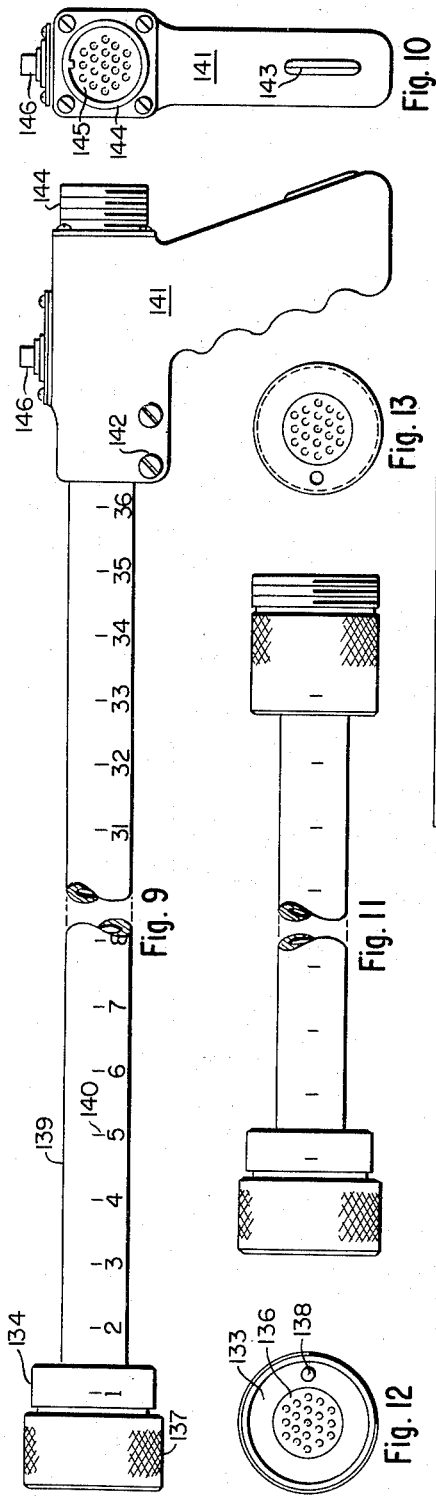
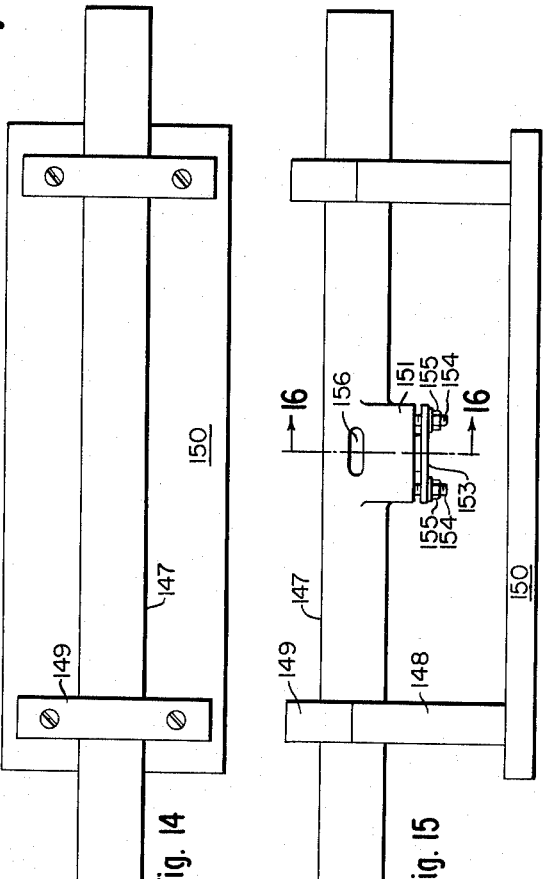
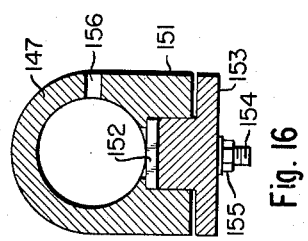
INVENTOR.
ROBERT C. SCOTT
BY
Kenway, Jenney, Witter & Hildreth
ATTORNEYS May 20, 1958 R. C. SCOTT 2,835,127
HARDNESS TESTER
Filed March 3, 1954 7 Sheets-Sheet 4
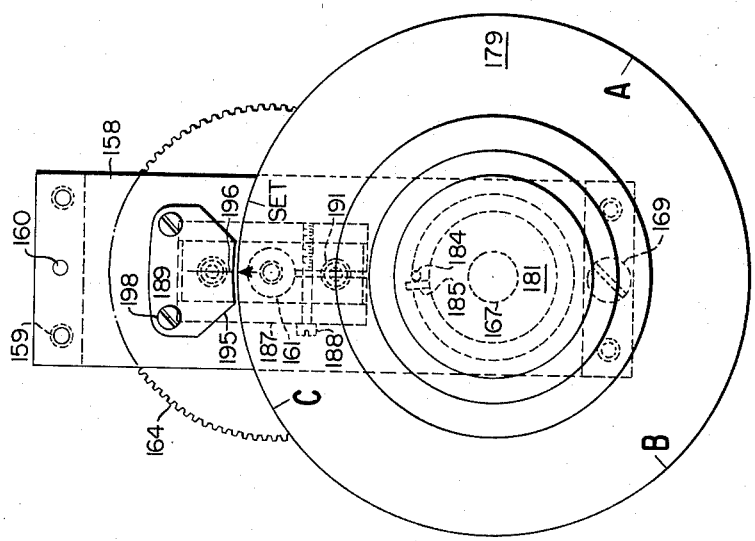
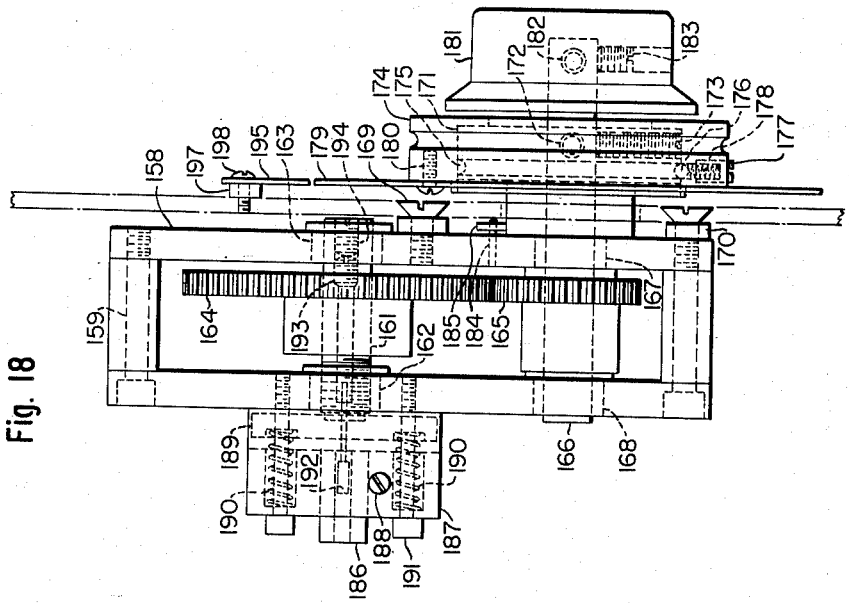
INVENTOR.
ROBERT C. SCOTT
BY
Kenway, Jenney, Witter & Hildreth
ATTORNEYS May 20, 1958 R. C. SCOTT 2,835,127
HARDNESS TESTER
Filed March 3, 1954 7 Sheets-Sheet 5
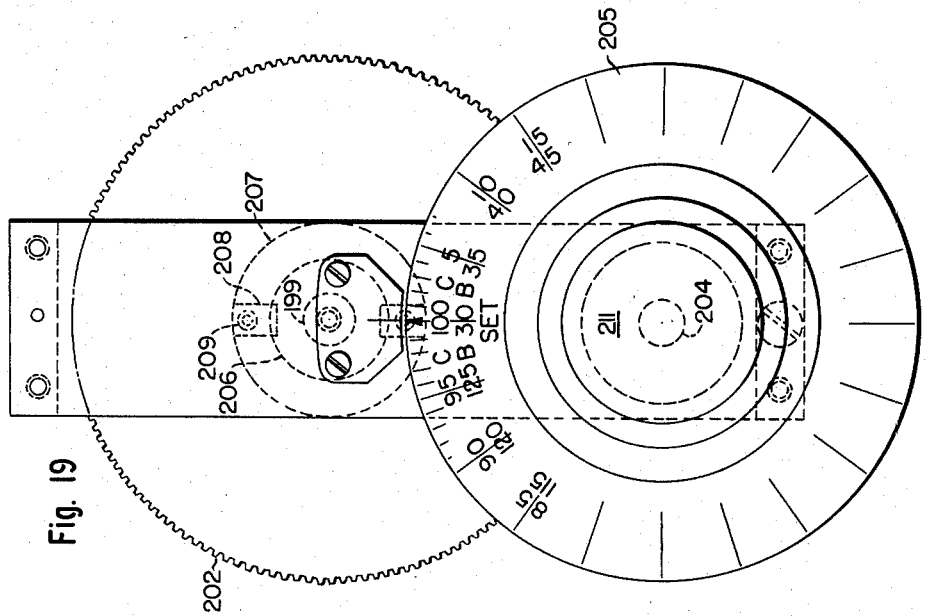
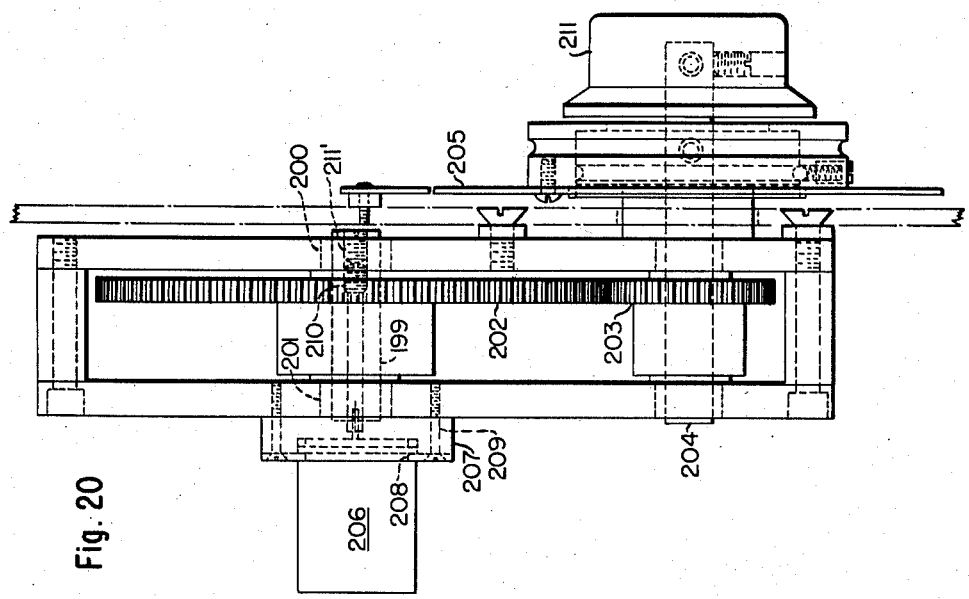
INVENTOR.
ROBERT C. SCOTT
BY
ATTORNEYS

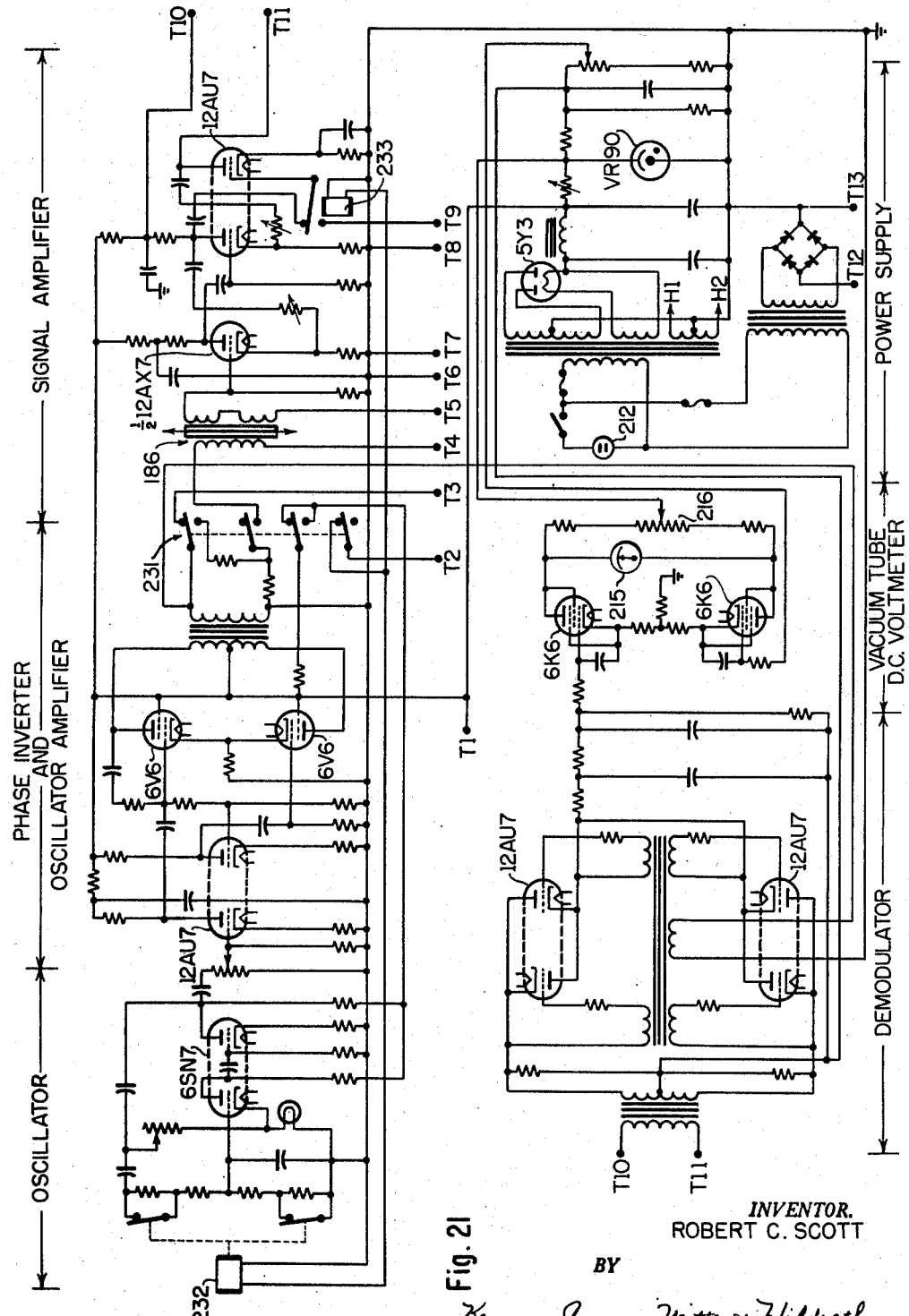

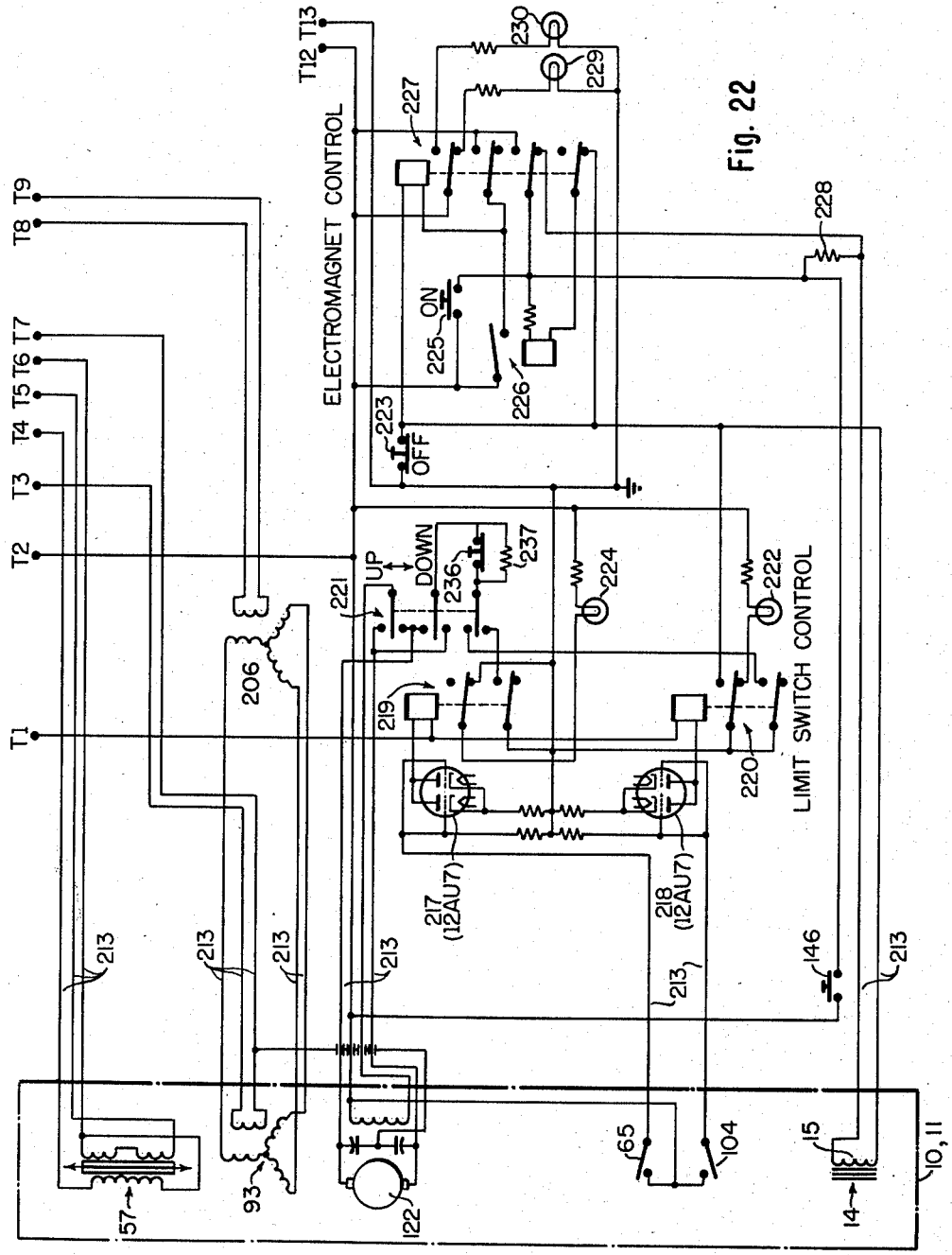

United States Patent Office 2,835,127
Patented May 20, 1958

2,835,127

HARDNESS TESTER

Robert C. Scott, Belmont, Mass.

Application March 3, 1954, Serial No. 413,791

15 Claims. (Cl. 73—81)

This invention relates to means for testing the hardness of materials and in particular to a portable hardness testing machine adapted to test the hardness of interior surfaces of tubular sections. More specifically the apparatus comprising this invention is especially suited to test the hardness of interior surfaces of gun barrels of both small and large caliber.

One important object of this invention is to provide a direct reading hardness testing device capable of being operated by a single person.

Another important object of this invention is to provide a hardness testing device having long term stability and capable of rendering rapid and accurate readings on the softer as well as the harder metals.

Another object of this invention is to provide an electrically operated hardness testing device suited to receive electrical energy from a portable battery as well as from power mains.

A more specific object of this invention is to provide means for rigidly holding the hardness testing device at any desired location within a gun barrel to prevent even the slightest motion of the device relative to the barrel while the actual test is performed.

Still another object of this invention is to provide a device capable of making hardness tests on either the lands or on the bottom of grooves in a gun barrel.

In the accomplishments of these and other objects, I provide as one important feature of this invention an electrically actuated toggle mechanism for locking the device in position within a gun barrel or any circular bore.

Another feature of this invention is the provision of extension tubes and interchangeable guide and centering plates, blocks and penetrator extension studs to permit the carrying out of hardness tests on gun barrels of any length and diameter.

Another feature of this invention is the provision of electromechanical servo systems utilizing bridge-type null-balancing electronic circuits for measuring and indicating loading and hardness, thereby avoiding inaccuracies which otherwise might be caused by minor changes in voltage and/or frequency.

Still another feature of this invention is the provision of a limit switch in the circuit of a driving motor to prevent overtravel of the penetrator, thereby eliminating the possibility of damage to the driving mechanism and the surface being tested.

These and other objects and features of this invention will be better understood and appreciated from the following detailed description of a preferred embodiment thereof selected for purposes of illustration and shown in the accompanying drawing, in which:

Fig. 1 is a view in side elevation of a hardness tester constructed in accordance with this invention as it may be employed in performing tests on the internal surface of a gun barrel, Fig. 2 is a top plan view of one embodiment of my hardness testing device, showing by means of dotted lines the internal components and mechanisms and their constructional arrangement, Fig. 3 is a view in side elevation of the device showing by means of dotted lines the internal components and mechanisms and their constructional arrangement, Fig. 4 is a sectional view taken along sight lines 4—4 of Fig. 3, showing a toggle mechanism forming part of an electromechanical means for securely holding the hardness testing device within a tube or gun barrel, Fig. 5 is a view in section taken along sight lines 5—5 of Fig. 3 showing one end of a load member and a linear variable differential transformer assembly for measuring and indicating the amount of loading applied to the penetrator, Fig. 6 is a view in section taken along sight lines 6—6 of Fig. 3 showing a part of a gear assembly, Figs. 7 and 8 are enlarged views in sectional elevation of portions of the hardness testing device shown in Fig. 3, Fig. 9 is a view in side elevation of an extension control tube and pistol-grip handle employed to facilitate inserting and orienting the hardness testing machine within a tube or a gun barrel, Fig. 10 is an end view of the extension control tube and pistol-grip handle shown in Fig. 9, Fig. 11 is a view in side elevation of an intermediate extension tube which may be employed in my invention, Figs. 12 and 13 are end views of female and male mechanical connectors respectively, Fig. 14 is a plan view of a bench checker for testing the accuracy of a device constructed in accordance with this invention, Fig. 15 is a view in side elevation of the bench checker, Fig. 16 is a view in section taken along sight lines 16—16 of Fig. 15, Fig. 17 is a view in side elevation of means for measuring and indicating the amount of loading applied to the penetrator, Fig. 18 is a view in sectional elevation of the apparatus shown in Fig. 17, Fig. 19 is a view in side elevation of means for measuring and indicating the hardness of the material being tested, Fig. 20 is a view in sectional elevation of the means illustrated in Fig. 19, and Figs. 21 and 22 are schematic diagrams together showing the electrical circuits for controlling and operating the hardness tester.

Proceeding now to a description of this invention, an inspection of Fig. 1 reveals the manner in which the hardness tester may be employed. Briefly, a gun barrel 9 to be tested receives through its muzzle a generally cylindrical body having projecting surfaces 49, 123 and 89, which cooperate to lock the cylindrical body in position. An extension tube 139 coupled to the body has at its terminal portion a pistol grip 141 which facilitates the positioning of the device at a desired location within the barrel. A penetrator 73 movable radially from the cylindrical body contacts the surface to be tested. Through an elaborate electromechanical system which will be described in detail later, the measurements of the load on the penetrator and the penetration thereof are recorded on a panel 8.

Referring to the detailed illustrations of Figs. 2-8, the device comprises a main frame represented by two semicircular sections 10 and 11, which may be constructed of stainless steel, accurately machined and fitted to contain and support the internal parts to be described presently. The diametrical faces of the semicircular sections are ground true and flat after machining, and are provided with snug-fitting dowel pins 12 to maintain accurate alignment of the sections. A plurality of socket-type machine screws 13 are provided to secure the sections together.

An electromagnet 14, forming part of an electromechanical means for holding or retaining the tester within the gun barrel during the making of hardness tests is fastened to one end of the main frame sections. The electromagnet 14 is of cylindrical flat-faced plunger type, energized preferably by direct current or rectified alternating current, and comprises a magnetizing coil 15 wound on a brass bobbin 16 (Fig. 8). A core-end 17, a guide-end 18, an outer shell 19 and a plunger 20 which surround the electromagnet, are all made of low-content carbon steel and are suitably annealed after machining, to provide high magnetic saturation with the resulting high magnetic force and low magnetic retentativeness. The bobbin 16 of the magnetizing coil is centered by the core-end 17 which extends partially within the bobbin. Additionally the core-end and the guide-end 18, press-fitted to the outer shell, cooperate to minimize air gaps and provide maximum mechanical rigidity of the entire electromagnet structure.

An emergency release rod 21, preferably made of non-magnetic material, is screwed and doweled to the inner end of the core or plunger 20 and extends through a free-fitting hole centered in the core-end 17. An emergency release button 22 is provided with a shoulder to seat a compression spring 23, and is screwed to the outer end of the emergency release rod 21. A cap 24 of non-magnetic material is fastened to the core-end 17 by three threaded studs 25, which also cooperate with knurled thumb nuts 27 to secure in position a removable guide plate 26.

The compression spring 23 applies an opposing force to the plunger 20, which aids in returning both the plunger 20 and a toggle mechanism (to be described later) to their open position when the magnet coil is de-energized. By applying an external force to the emergency release button 22, as by a rod or stick pushed down the tube or the gun barrel, the plunger and toggle mechanism may be forcibly returned to the open position, if for any reason they fail to return to the open position when the magnet coil is deenergized.

As most clearly illustrated in Fig. 8, the electromagnet assembly is fastened by machine screws 29 to an adapter block 28 made of a non-magnetic material. The adapter block fits snugly over the reduced ends of the main frame sections 10 and 11, to which it is firmly attached by machine screws (not shown). Both the electromagnet assembly and adapter block are smaller in diameter than the main frame sections 10 and 11 to permit an upward tilting of the electomagnet end of the machine when in the holding position, for reasons that later will become obvious.

A pair of connecting links 30 and 31, also made of non-magnetic material, connect the plunger 20 of the electromagnet to the toggle mechanism. The connecting link 30, threaded on one end, is screwed and doweled to the outer end of the plunger. A retaining pin 32, held in position by a washer 33 and a cotter pin 34, forms a hinged joint between the two links and thus insures freedom of operation of the plunger within the electromagnet.

The toggle mechanism comprises an upper toggle block 35 machined to provide a piston type central portion fitted to a guide hole in the main frame section 10. The toggle block is spring loaded by four compression springs 36 positioned within four holes in the main frame section, and is retained by four socket-type machine screws 37 which by virtue of the spacers 38 nevertheless allow movement of the toggle block relative to the main frame section 10. A lower toggle block 39 is machined to provide a piston type central portion and is fitted to and extends through a hole in the main frame section 11. The lower toggle block 39 is spring loaded by two compression springs 40 positioned within two holes in the main frame section 11, and is retained by four socket-type machine screws 41. Four spacers 42 surround a portion of the screws 41 and permit movement of the toggle block relative to the frame section 11. An upper toggle link 43 is hinged within the toggle block 35 by a pin 44, and lower toggle links 45 and 46 are hinged to opposite sides of the lower toggle block 39 by a pin 47 and a washer 48. These connections are best illustrated in Fig. 4.

A removable jam block 49, made of hardened steel is fitted to a recess machined in the outer face of the toggle block 39, and is oriented with respect to the curvature of the tube or gun barrel by a pin 50. A socket-type machine screw 51 retains the jam block on the lower toggle block. The upper toggle link 43, the lower toggle links 45 and 46, and the connecting link 31 are hinged together on a common center by a pin 52 held in position by a washer 53 and cotter pin 54. To facilitate assembly of the toggle mechanism, two counterbored holes with spring type button covers 55 are provided in the main frame sections 10 and 11.

The toggle mechanism is designed to move the jam block 49 downward, thus tilting the electromagnet end of the machine upward when the electromagnet is energized, and to move jam block 49 upward and consequently the electromagnet end of the machine downward, when the electromagnet is deenergized. To assure opening of the toggle mechanism upon deenergization of the electromagnet the orientation of the elements is such that alignment of upper toggle link 43 with lower toggle links 45 and 46 is impossible for the core end 17 limits the travel of the plunger 20.

Proceeding now to the loading apparatus of the testing device, a load spring 56, which I prefer to make of beryllium copper suitably heat treated, is longitudinally slotted to form a compression type of hairpin spring with upper and lower sections. The outer end of the load spring is machined to accommodate a linear variable differential transformer 57 secured in position by a mounting block 58 and flat head machine screws 59 (see Fig. 5). The transformer is provided with three coaxial coils, the ends of which are connected to terminals 60. The terminals 60 are mounted on an insulating panel 61 which is fastened to the upper section of the load spring by machine screws 62.

An insulating block 63 is fastened to the lower section of the load spring by machine screws 64, and supports the lower contact of a limit switch 65, while the upper contact of the switch is supported by the panel 61 on the upper section of the load spring. The contacts, which are normally open, are arranged to close when the loading exceeds its normal maximum value and when the load spring sections are compressed beyond their normal amount. The contacts are connected in the grid circuit of an electronic tube used in connection with a motor control circuit (to be described in detail later) for limiting the loading on a penetrator load member, and hence are not reqired to carry more than a few microamperes of current at relatively low voltage. Thus the contacts will not be subject to arcing or other impairment due to their slow make and break action.

Returning to the description of the loading apparatus, a core 66 is axially movable within a centrally located hole in the linear variable differential transformer 57, and is connected to the lower section of the load spring by a core extension rod 67 which freely passes through a hole in the upper section of the load spring. The lower end of the core extension rod is threaded and slotted to facilitate positioning of the core relative to the transformer windings, and is secured in place by a set screw 68. A pair of tapped holes in the main frame section 11 located respectively below and at the side of the core extension rod 67 facilitate the positioning of the transformer core without separating the main frame sections.

A pair of set screws 69 and 70 cover the holes to prevent accidental dislocation of the core.

A penetrator extension rod 71 which may be made of stainless steel is press-fitted into the lower section of the load spring 56. A sleeve 72 accurately fitted to move upward and downward within a hole in the lower frame section 11 is itself press fitted about the rod 71. The lower end of the penetrator extension rod is threaded to receive the penetrator 73 which indents the work during the making of a hardness test, while a pair of return springs 74 positioned within two holes in the main frame section 11 provide an upward or returning force for the load member assembly. The penetrator or indentor may alternately be a conically shaped diamond, a steel ball, or some other type of indenting tool. A stud 75 is press-fitted to the upper section of the load member spring on a common center line with the penetrator extension rod and is machined and work hardened to contain and seat a hardened steel ball 76.

A combination penetrator spindle and gear 77 is counterbored on the lower end of its spindle portion to telescopically receive the stud 75 and is also shaped and work hardened on the inner face of its counterbore to seat the hardened steel ball 76. The upper end of the spindle is precision threaded and fits a precision threaded sleeve 78 which is press-fitted into a hole in the main frame section 10 while the lower end of the spindle is fitted to a sleeve bearing 79 which is press-fitted into a hole in a bearing plate 80. The bearing plate 80 is secured in position by a plurality of socket type machine screws 82 while a number of dowel pins (not shown) maintain its alignment.

The load spring 56 is thus interposed between the penetrator spindle and gear 77 on one side and the penetrator extension rod and penetrator on the other, all of which are on a common center line. Hence, by turning the penetrator spindle and gear in one direction, both the penetrator spindle and gear 77 and the load member assembly and penetrator will be moved downward in the vertical direction. Initially such movement will be opposed only by the load member return springs 74. Subsequently when movement of the penetrator is resisted by engagement of the penetrator with the surface being tested, the load spring 56 will be compressed which will move the transformer core axially within the linear variable differential transformer. The displacement of the core 66 will vary the magnetic flux interlinkages in the transformer and consequently the values of voltage induced in the secondary coils used to measure and indicate the loading on the penetrator will change. By turning the penetrator spindle and gear in the opposite direction, the penetrator loading will be removed thereby permitting the load member spring to return to its normally uncompressed position. The transformer core will, as a result thereof, return to its no-load position, thus changing the voltage induced in the transformer coils to their original no-load values. Thereafter, return springs 74 will move the load member assembly and penetrator upward.

To accommodate gun barrels of different diameters, a pair of sleeves 83 are threaded to accommodate a pair of socket-type machine screws 84, and are press-fitted into counterbored holes in the main frame section 11. The screws 84 serve to attach an extension block 85 to the section 11, the block 85 being of a height selected for testing the hardness of a tube or gun barrel having a particular diameter. If the gun barrel has lands, the extension block is provided with a guide pin 86 which extends within a land groove, and thus guides and orients the penetrator relative to the lands so that the penetrator is centered either on top of a land or on the bottom of a groove during the making of a hardness test. Also, penetrator riser studs of varying height may be screwed to the lower end of the penetrator extension rod between said rod and the penetrator when the diameter of the tube or gun barrel is of a size which requires such an extension.

A pair of sleeves 87 are threaded to accommodate socket-type machine screws 88, and are press-fitted into counterbored holes in the main frame section 10 of the device. The screws 88 secure a pressure block 89 in a recess on top of the main frame section 10. The pressure block 89 machined on top to provide a curved contacting surface, and of a height selected for testing the hardness of a tube or gun barrel having a particular diameter, is positioned on a common center line with the load member and the penetrator.

The combination penetrator spindle and gear 77 is driven by a servo gear 90 provided with a centrally located hole threaded on its upper end. A thrust and sleeve bearing 91 is press-fitted into a hole in main frame section 10 and surrounds the upper portion of the spindle of the gear 90. A second thrust and sleeve bearing 92 is press-fitted into a hole in the bearing plate 80. A stator of a rotary type servo transmitter 93 is snugly fitted within a machined recess in the underside of the bearing 92, and is secured in place by a wedge plate 94 and a machine screw 95. A rotor shaft extension of the servo transmitter porjects within the centrally located hole in the spindle of the servo gear 90 and is connected to the spindle by a clamping screw 96 which is provided with three spring type jaws that clamp around the rotor shaft. A set screw 97 locks the clamping screw 96 in position so that the rotor of the servo transmitter is secured to and turns with the servo gear 90.

The servo gear 90 is driven by a spur gear 98 which is integrally machined with its spindle, and is threaded on one end. A thrust and sleeve bearing 99 surrounding the upper portion of the spindle is press-fitted into a hole in the main frame section 10, while another thrust and sleeve bearing 100 surrounding the lower portion of the spindle is press-fitted into a hole in the bearing plate 80. A second spur gear 101 is press-fitted to the spindle of the spur gear 98 for rotation therewith. An elliptical nut 102 is fitted to the threaded section of the spindle of the gear 98 and moves upward and downward within an elliptically-shaped hole in the main frame section 11.

A limit switch button 103 is press-fitted to the outer face of the nut 102 and is positioned to close the normally open contacts of a limit switch 104 when the nut 102 reaches its extreme downward position (the equivalent of the extreme upward position of the load member and penetrator). The limit switch contacts are connected in the grid circuit of an electronic tube used in connection with the motor control circuits for limiting the upward travel of the penetrator load member, and hence are not required to carry more than a few microamperes of current at relatively low voltage. The limit switch is mounted on a removable cover plate 105, and is secured within a machined recess in the frame section 11.

A spur gear 106 which drives the spur gear 101 is press-fitted on one end of a spindle 107. The spindle 107 carries at its other end a worm gear 108 press-fitted thereon. A pair of thrust and sleeve bearings 109 and 110 are fitted into holes in the main frame sections 10 and 11 respectively and surround the terminal portions of the spindle.

The worm gear 108 is driven by a worm 111 which is fitted on and pinned to one end of a shaft 112, while a spur gear 113 is press-fitted on and pinned to the other end of the shaft 112. A pair of thrust and sleeve bearings 114 and 115 are press-fitted to holes in main frame section 10 and surround the ends of the shaft 112. A spur gear 116 fitted and pinned to one end of shaft 117 drives the spur gear 113 while a worm gear 118 is fitted and pinned to the other end of shaft 117. Another pair of thrust and sleeve bearings 119 and 120 are press-fitted to holes in main frame section 10 and receive the ends of the shaft 117.

Completing the driving mechanism for the penetrator is a worm 121 which is pinned to a shaft of a direct current, series type, reversible electrical motor 122. The motor is flange mounted on the inner face of the counterboard end of the main frame section 10 and 11 by machine screws (not shown).

A block 123 which serves as a fulcrum for the main frame when secured in position within a gun barrel by the toggle actuated block 49 is accurately fitted to a machined recess in the frame section 11. The fulcrum block is oriented with respect to the curvature of the tube or gun barrel by a pin 124 and is secured in position by flush-fitting socket-type machine screw 125.

An end frame 126 telescopically received within the ends of the main frame sections is secured thereto by machine screws (not shown). To secure extension tubes to the hardness testing device, a male mechanical connector block 127 is threaded on one end and fastened to the flange of the end frame 126 by screws 128 (Fig. 2). The block 127 retains within its center hole a flush-fitting multicontact female electrical connector insert 129, to which all electrical wiring and circuits to and from the electrical components within the frame are connected. The electrical wiring (not shown in Figs. 2–8), is run from the various electrical components through longitudinal holes in the main frame sections and thence through slots (not shown) in the end frame 126.

The motor end of the main frame sections 10 and 11 and the end frame 126 are reduced in diameter, tapering approximately from the center line fulcrum block 123 to the face of the end frame, to permit a downward tilting of the motor end of the machine when in the holding position.

A centering disc 130 is fastened to the face of the end frame 126 by four threaded studs 131 provided with knurled thumb nuts 132. The centering disc is made in two semi-circular sections and is replaceable by other semi-circular sections of varying diameters when the size of the tube or gun barrel to be tested dictates. In the same vein, the fulcrum block 123, the pressure block 89, the extension block 85, the jam block 49 and the guide plate 26 may be replaced by similar elements of different sizes to facilitate the performing of tests on tubes or gun barrels of extreme dimensions.

Turning now to a discussion of the extension control apparatus illustrated in Figs. 9–13, an extension control tube, shown in Figs. 9 and 10 is adapted to be connected to the hardness tested by a female mechanical connector (see Fig. 12) which includes a block 133 fastened to a flange 134. A multicontact male electrical connector insert 136 is retained within a center hole in the block. An outer sleeve 137 having an internal shoulder that fits a groove in the block 133 is free to turn relative thereto. A polarizing pin 138 fits a polarizing hole in the male mechanical connector to align and orient the contacts in the electrical connector inserts is also secured to the block 133. The flange 134 is secured as by welding to tube 139 having an engraved scale 140 thereon for indicating the distance from the penetrator to the end of the tube or the gun barrel being tested. The other end of the tube 139 is fitted to a pistol-grip handle 141 clamped in position by socket-type machine screws 142 so that an engraved line 143 on the rear of the grip is in vertical alignment with the penetrator.

A flange-type electrical connector 144 fastened to the end of the pistol-grip handle contains a multicontact female electrical connector insert 145 to which is connected the electrical wiring that extends through the extension control tube from the insert 136. A push-button switch 146 is conveniently mounted on the upper side of the pistol-grip handle 141 for energizing the electromagnet forming part of the electromechanical means for holding the device in the tube or the gun barrel.

An intermediate extension tube is shown in Fig. 11 and is used for increasing the distance the frame may be inserted within a tube or a gun barrel. The intermediate tube when employed will be connected between the frame and the control tube shown in Fig. 9. The intermediate tube is provided with male and female mechanical connectors each with electrical connector inserts. Wiring contained in the tube places the inserts in electrical communication. When connected together, the connecting tubing provides a mechanically rigid means for inserting and orienting the hardness tester within a tube or a gun barrel, and in addition provides means for determining the position and distance of the penetrator from the end of said tube or barrel.

A bench checker shown in Figs. 14–16 and used for checking the calibration of the hardness testing device against standard test blocks of known hardness values will now be described in detail. The checker comprises a seamless steel tube 147 supported by a pair of blocks and clamps 148 and 149 mounted on a base 150. The tube is capable of withstanding all internal forces imposed by the maximum penetrator loading without deforming, and is internally ground to provide a smooth and straight surface. A block 151 is welded to the tube at approximately its mid point, and is machined to accommodate a standard test block 152 shown in Fig. 16, which is held tangent to the inner radius of the tube by a steel clamping block 153 firmly secured in position by studs and nuts 154 and 155. A horizontal slot 156 is provided on one side of the tube to facilitate longitudinal alignment of the penetrator with respect to the test block, by observing the position of a grooved line 157 machined on the circumference of the main frame sections 10 and 11 representing the centerline of the penetrator. Perpendicular alignment of the penetrator with respect to the test block is achieved by orienting the engraved line on the pistol-grip handle so that it points vertically downward, with the push-button switch in the upper position.

The electromechanical servo mechanism shown in Figs. 17 and 18 for measuring and indicating the amount of loading applied to the penetrator will now be described. The apparatus illustrated is mounted on the panel of the portable carrying case 8 (see Fig. 2) containing the electrical circuits and means for controlling and operating the hardness tester. In detail, a supporting framework 158 about which the mechanism is organized is fastened together and held in rigid alignment by machine screws 159 and dowel pins 160.

A shaft 161 having a centrally located hole threaded at one end, is threaded at its other end to register with a threaded bearing 162. The bearing 162 is press-fitted in the rear member of the supporting framework while a bearing 163 is fitted to the front end of the shaft and secured to the front member of the supporting framework. A gear 164 is fitted intermediate the ends of the shaft 161 and meshes with a gear 165 secured to a shaft 166. Both of the gears are lapped together after assembly to minimize back lash. A pair of sleeves and thrust bearings 167 and 168 are fitted to the shaft 166 and are recessed in the front and rear members of the supporting framework, respectively. The supporting framework is fastened to and spaced from the underside of the panel of the carrying case by a number of flat headed machine screws 169 and cooperating risers 170. An inner drum 171 fits through a clearance hole in the panel and is fastened to the shaft 166 by set screws 172 and 173. An outer drum 174 surrounds the inner drum and is free to turn on the inner drum by finger pressure on its knurled edge, but otherwise turns with the inner drum during the hardness testing of surfaces. To accomplish this, a groove 175 is provided on the face of the inner drum to serve as a ball race for a steel ball 176. A retaining stud 177 is screwed through the face of the outer drum 174 and carries the steel ball 176 as well as a spiral spring 178 which exerts pressure on the ball to hold the outer drum in position. The spring also urges the ball into its groove 175 to prevent the outer drum from slipping or turning relative to the inner drum when not intended.

A dial 179 engraved with scale markings for the various penetrator loadings is fastened to the rear of the outer drum 174 by machine screws 180. A knob 181 is fastened to the shaft 166 by a pair of set screws 182 and 183. The shaft 166 is restricted in its rotation to not more than approximately three hundred and forty degrees by pins 184 and 185, to prevent vertical overtravel of the gear 164 and the shaft 161 in either the upward or downward direction.

A linear variable differential transformer 186 is fitted to a hole in a supporting block 187 slotted on one side for clamping the transformer in position with the aid of a machine screw 188. A cross bar 189 slidably fits a milled recess in the forward end of the supporting block 187, and exerts a forward pressure on the end of the shaft 161 extending beyond the rear member of the supporting framework, thereby counteracting any axial motion that may be present or that may develop between the shaft and the threaded bearing 162. A pair of compression springs 190 contained within drilled and counterbored holes in the supporting block bear against the bar to insure its contact with the shaft. The supporting block is secured to the rear member of the supporting framework by machine screws 191 which pass through free-fitting holes in the cross bar. The center hole of the transformer is thereby axially aligned with the shaft 161. The screws 191 further serve as lateral guides for the cross bar.

The core 192 of the transformer 186 is connected to a clamping screw 193 which extends through a clearance hole in the cross bar 189 and is screwed into the threaded section of the center hole of shaft 161. The clamping screw 193 is locked to the shaft by a set screw 194 after the optimum position of the core relative to the transformer coils has been determined. A dial pointer 195, made of transparent material with an engraved center line 196 is supported forward of the panel by risers 197, and is secured to the panel by machine screws 198.

By rotating the knob 181, both the shaft 161 and the transformer core 192 will rotate, causing the shaft and the core to move axially relative to the supporting framework and the transformer coils. The axial movement of the core within the transformer will change the magnetic flux interlinkages, and as a result thereof the values of voltages induced in the secondary coils of the transformer will also change. These voltages are employed to measure and indicate the loading on the penetrator and will be proportional to the axial motion of the core and the angular rotation of shaft 161.

The electromechanical servo mechanism for measuring and indicating the depth of penetration or hardness illustrated in Figs. 19 and 20 will now be described. Like the servo mechanism illustrated in Figs. 17 and 18, the apparatus is mounted on the panel of the portable carrying case containing the electrical circuits for controlling and operating the hardness tester. With but a few distinctions which will become clear in the following paragraph, the device is similar to the electromechanical mean for measuring and indicating the loading applied to the penetrator. A shaft 199 is fitted to a pair of sleeve and thrust bearings 200 and 201 which are press-fitted to the front and rear members of the supporting framework. A gear 202 is carried by the shaft 199 and meshes with a gear 203 carried by a shaft 204. The gears are precision cut and lapped together after assembly to minimize back lash. A dial 205 similar to the dial 179 and engraved with suitable hardness scales for rendering directly hardness readings. The stator of a rotary type electrically operated servo receiver 206 is snugly fitted within a counterbored hole in a block 207, and is secured in place by wedge plates 208 and flat-head machine screws 209. The screws 209 also serve to fasten the block 207 to the rear member of the supporting framework with the servo receiver on a common centerline with the shaft 199. The rotor shaft extension of the servo receiver projects within a center hole in the block 207 and is connected to the shaft 199 by a clamping-screw 210. A set screw 211' locks the clamping screw 210 in position so that the rotor of the servo receiver is secured to and turns with the shaft 199 which is free to turn without restrictions in either direction. By rotating a knob 211 the rotor of the servo receiver will be rotated relative to its stator windings which will change the magnetic flux interlinkages, thereby changing the value of voltage induced in the rotor windings of the servo receiver. The voltage thus induced in the rotor windings is used to measure and indicate the depth of penetration, or hardness, and will be proportional to the angular rotation of knob 211.

The source of electric supply and the electrical circuits and means for controlling and operating the hardness testing device during the making of hardness tests are shown diagrammatically in the deenergized position and in symbolic form in Figs. 21 and 22. The circuit elements and means pertaining to the various control and operational requirements are designated accordingly.

Referring to the drawings, the electrical circuits for controlling and operating the hardness testing device are connected to an alternating current power supply by an electrical plug receptacle 212 mounted on the panel of the portable carrying case 8. The electrical circuits are connected to the hardness testing device by a multiconductor cable 213, provided with polarized multiconductor electrical connectors at its ends. The cable is connected between the multiconductor electric connector 144 on the end of extension control tube (see Fig. 10) and a multiconductor electrical connector 214 mounted on the panel of the portable carrying case.

The power supply transforms and rectifies the alternating current voltage from the power line, and furnishes rectified current to the electronic tubes and circuits, and alternating current to the filaments and heaters of the electronic tubes. The power supply also supplies rectified current to the electromagnet 14 and the driving motor 122 within the hardness testing machine and for the indicating lamps on the panel of the portable carrying case.

An oscillator shown in Fig. 21 furnishes voltages of two different frequencies. The voltage of greater frequency is employed to energize the linear variable differential transformers 57 and 186 forming part of the electromechanical mechanism for measuring and indicating the loading of the penetrator, while the voltage of lower frequency is used to energize the rotary type servo transmitter 93 and the receiver 206 forming part of the electromechanical mechanism for measuring and indicating the depth of penetration, or hardness. The different voltages are not furnished at the same time, for the electromechanical mechanisms are not used simultaneously during the making of hardness tests.

A phase inverter and oscillator amplifier connected in circuit with the oscillator increases the values of voltage and power received therefrom, and furnishes input voltages and power at suitable values to the electromechanical servo systems. A signal amplifier in the circuit increases the value of the alternating current from both of the electromechanical servo systems. A demodulator directly connected to the amplifier develops a rectified pulsating voltage output, which is subsequently filtered to smooth out the pulses, and which is proportional to the value of the alternating current input to the demodulator. A vacuum-tube voltmeter of the null-balance type with a zero center scale on an output balance meter 215 is connected in circuit with the demodulator. To balance the meter 215 with a zero input voltage to the amplifier, the position of a potentiometer 216 should be adjusted until the meter pointer is aligned with the zero center mark on the meter dial.

The signal amplifier, the demodulator, and the vacuum-tube voltmeter circuits are connected so that they are phase discriminating, or sensitive to the direction of the unbalanced input voltages as well as to the magnitude of the unbalance. Hence, if an unbalanced voltage is applied to the signal amplifier from either of the electromechanical servo systems, the pointer of the output meter will be deflected to one side of the zero center mark on the meter scale, and the deflection will be proportional to the value of the unbalanced voltage. If the phase of the unbalanced voltage of direction of unbalance is reversed, the pointer of the output balance meter 215 will be deflected to the opposite side of the center mark on the meter scale, and the deflection will be proportional to the value of the uabalanced voltage, as in the previous case.

A limit switch control circuit prevents the penetrator loading from being exceeded beyond its normal maximum value, and also prevents the penetrator from being withdrawn within the hardness testing machine beyond its normal maximum upward position. Furthermore, it prevents the electromagnet from being deenergized until the penetrator is at its maximum upward position. The manner in which this is accomplished will now be described. A pair of electronic tubes 217 and 218 will conduct and thus energize their respective relays 219 and 220, when the grids of the tubes are not negative with respect to their cathodes, as when their respective limit switches are open. When the grids become negative with respect to their cathodes, however, as when their respective limit switches are closed, the electronic tubes cease to conduct, thereby deenergizing their respective relays.

Therefore, when the penetrator is in its maximum upward position, the limit switch 104 shown schematically in Fig. 22 will be closed, thus rendering the grid of the electronic tube 218 negative with respect to its cathode; hence, the relay 220 will be deenergized (shown symbolically in Fig. 22). Thus, the motor circuit will be opened if a three-pole double-throw motor control switch 221 is moved to its "Up" position; if, however, the motor control switch is placed in the position marked "Down," the motor circuit will be closed and the motor will be energized, since the relay 219 will be in its energized position, and the penetrator will be moved downward. An indicating lamp 222 will light to signify that the penetrator is in its maximum upward position. Furthermore, by depressing a push-button switch 223 marked "off" and which forms part of the electromagnet control, the electromagnet may be deenergized.

If the penetrator is in its downward position and the normal penetrator loading is exceeded, the limit switch 65 will be closed, thus rendering the grid of the electronic tube 217 negative with respect to its cathode. As suggested above, this condition will cause relay 219 to be deenergized, assuming the position shown symbolically in Fig. 22. Thus, the motor circuit will be opened if the motor control switch 221 is in the position marked "Down"; if, however, the motor control switch is placed in the position marked "Up," the motor circuit will be closed and the motor will be energized because the relay 220 will have assumed its energized position; hence, the penetrator will be moved upward. Also, an indicating lamp 224 will light to signify that the normal penetrator loading has been exceeded. Furthermore, if the penetrator is not in its maximum upward position the electromagnet will not be deenergized if the push-button switch 223 is depressed, thereby protecting the penetrator from accidental damage. Moreover, if the electronic tubes 217 or 218 fail, their associated relays will be deenergized, and such a condition will be indicated by the indicating lamps.

The electromagnet 14 may be energized either by depressing a push-button switch 225 marked "on" which is mounted on the panel of the portable carrying case, or by depressing the push-button switch 146 mounted on the pistol grip handle 141 of the extension control tube 139. The control circuits are so arranged that by depressing either of the push-button switches, full voltage and therefore maximum current will be applied to the electromagnet coil 15 to produce maximum pull on the plunger 20 for operating its associated toggle mechanism forming part of the electromechanical means for holding the hardness testing device within a tube or gun barrel.

After a lapse of time (approximately one second) a time-delay relay 226 will close its switch which will energize another relay 227, thus inserting a resistance 228 in the electromagnet circuit and thereby reducing the value of current through the electromagnet coil 15 for holding the plunger in the closed position. The relay 227 will remain in its energized position and the time-delay relay 226 will be deenergized. In addition, the circuit of an indicating lamp 229 will be opened, and the circuit of an indicating lamp 230 will be closed, to signify that the electromagnet 14 has become energized. Thereafter, it will not be possible to deenergize the electromagnet by depressing the push-button switch 223 unless the penetrator is in its maximum upward position, as previously described.

The linear variable differential transformers 57 and 186 forming part of the electromechanical servo system for measuring and indicating the loading on the penetrator, each include three coaxial coils on an insulating form which has a hole parallel to its axis. A steel core is supported in the hole which provides a preferred path for magnetic flux linking the coils. The center, or primary coil, is thus coupled electromagnetically with each of the two outer coils, or secondaries.

The primary coils of the transformers 57 and 186 mounted respectively on the penetrator load member within the main frame section and on the electromechanical measuring means on the panel of the portable carrying case, are connected in series and are energized from the output of the oscillator amplifier when a four-pole double-throw oscillator switch 231 is in its lower position. The two outer coaxial coils, or secondaries, of each transformer are connected in series opposition; hence, for a particular position of the core of each transformer the voltage induced in each secondary coil will be equal in magnitude but opposite in phase. When the core of one transformer is moved from this balance point, the voltage induced in the coils toward which the core is moved will increase, while the voltage induced in the opposite coil will decrease. The net voltage across the secondaries of each transformer, therefore, is of a larger value than that at the balanced point, the voltage variations being linear with changes in core position. Motion of the core in the opposite direction from the balance point will yield a similar voltage characteristic, except that the phase will be reversed. Thus, the linear variable differential transformers are phase discriminating, or sensitive to the direction as well as to the magnitude of core motion from the balance point.

By connecting the secondaries, or output, of the two transformers in series, as shown symbolically in Figs. 21 and 22, and by suitably phasing the connections between the two transformers, the net voltage induced in the secondaries of each of the transformers will be equal and opposite. This will result in a zero voltage across the secondary connections between the transformers if the cores of each transformer are displaced an equal amount and in the same direction from their respective balance points. By moving the cores of the transformers in the opposite direction, the phase of the induced voltages in the secondaries of each of the transformers will be opposite, but will otherwise yield a similar voltage characteristic. Thus by connecting the secondary connections between the two transformers to the grid of the first tube of the signal amplifier and to the common grounding wire of the electronic circuits, the net unbalanced voltage across the secondary connections between the two transformers will be amplified, modulated and indicated on the output balance meter 215, and the direction of unbalance of one of the transformer cores with respect to the other will be indicated by the direction of the meter pointer from the zero center on the meter scale. Hence, by calibrating the load measuring dial on the panel of the portable carrying case for the desired values of penetrator loading, a reliable and accurate means is provided for measuring and indicating the no-load and the minor and major loading used for the making of hardness tests. Furthermore, since bridge-type null-balancing circuits are used, the accuracy of the load measurements will be unaffected by minor changes of voltages and frequency.

The rotary type servo transmitter 93 and receiver 206 forming part of the electromechanical servo system for measuring and indicating the depth of penetration, or hardness, comprise salient-pole, single-phase rotors and Y-connected three-phase stators. The three-phase stator windings of the transmitter mounted within the main frame section, and the three-phase stator windings of the receiver mounted on the panel of the portable carrying case, respectively, are connected together and suitably phased. The salient-pole single-phase rotor of the transmitter is energized from the output of the oscillator amplifier when the oscillator switch 231 is in the position illustrated in Fig. 21; also, a pair of relays 232 and 233 will be energized by rectified direct current from the power supply. By energizing the relay 232, additional resistance will be inserted in each of the two arms of the oscillator circuits, thereby providing a lower and optimum frequency for the servo transmitter and receiver. The energization of the relay 233 will cause the salient-pole single-phase rotor of the receiver to be connected to the grid of the second electronic tube in the signal amplifier, thereby reducing the amplification factor to a suitable value. When the rotor of the transmitter 93 is energized a voltage will be induced in the rotor windings of the receiver. Then if the angular position of the receiver rotor is gradually changed relative to its stator windings, a balance point will be found at which the induced voltage in the rotor windings of the receiver will be a minimum. If the angular position of the receiver rotor is again gradually changed relative to its stator windings, the induced voltage in the rotor windings of the receiver will increase and the voltage variation will be linear with a change in angular position of the rotor. Changing the angular position of the receiver rotor in the opposite direction from the balance point will yield a similar voltage characteristic, except that the phase will be opposite. Furthermore, the same balance characteristic will be obtained if the angular position of transmitter rotor is changed relative to the angular position of the receiver rotor. Thus, the rotary type servo transmitter and receiver are phase discriminating, or sensitive to the direction as well as to the magnitude of the change of angular position of their rotors.

The unbalanced voltage induced in the rotor windings of the receiver is thus amplified, modulated and indicated on the output balance meter 215 and the direction of unbalance, or displacement of one of the rotors with respect to the other will be indicated by the displacement of the meter pointer from the zero center on the meter scale. Hence, by calibrating the hardness measuring dial 205 with the desired form of hardness scales, a reliable and accurate means is provided for measuring and indicating hardness. Furthermore, since bridge-type null-balancing circuits are used, the accuracy of the hardness measurements will be unaffected by minor changes of voltage and frequency.

The operation of the hardness tester comprising this invention will now be described in some detail. Before the actual test is performed, all paint, oil, scale or other grit and surface deposit should be removed from the interior surfaces to be tested. The hardness testing machine will then be fitted with blocks, guide plates and a penetrator extension stud of a size determined by the diameter of the tube or gun barrel to be tested. In the case of gun barrels with lands, a suitable guide block to orient the penetractor to the lands or on the bottom of the grooves, should be selected. Also, the extension control tube 139 and, if necessary, intermediate extension tubes as illustrated in Fig. 11 should be securely fastened to the hardness testing device. The multiconductor cable 213 is then connected between the main frame section and the panel of the carrying case, and the electrical plug receptable 212 is connected to the alternating current power lines. The main frame section is next inserted within the horizontal tube or the gun barrel to be tested, and is oriented and positioned with the aid of the engraved line 143 so that the pistol grip handle on the extension control tube points vertically downward. This assures normalcy of the penetrator relative to the surface to be tested.

The power may then be turned on by closing a switch 235 mounted on the panel of the carrying case, thereby energizing the power supply to provide suitable voltages for the entire control circuit and electromechanical mechanisms. Immediately thereafter, the indicating lamps 222 and 229 will be lighted signifying respectively that the penetrator load member is at its maximum upward position and that the coil 15 of the electromagnet 14 forming part of the electromechanical means for holding the hardness testing machine within the tube or gun barrel is deenergized. After a period of approximately fifteen minutes, to allow the electronic tubes and components to become thermally and electrically stabilized, either the push-button switch 146 on the pistol-grip handle, or the push-button switch 225 on the panel of the portable carrying case should be depressed, either of which will effect energization of the coil of the electromagnet 14 thereby causing the hardness testing machine to be held within the tube or the gun barrel. The indicating lamps 229 and 230 will then signify that the coil 15 of the electromagnet is energized and that the hardness tester is securely positioned. It is of the utmost importance that the work being tested remain stationary with respect to the structure of the testing device.

The manner in which the hardness testing machine is held within the tube or gun to insure that the relative position of the barrel and testing device is fixed is as follows: Energizing the coil 15 of the electromagnet 14 will cause the magnet plunger 20 to be pulled within the bobbin of the coil until the inner faces of the plunger and magnet core-end 17 bear against each other, thus causing the toggle mechanism to apply a vertically downward force on the jam block 49. The electromagnet end of the main frame will then be moved or tilted upward about the fulcrum block 123, causing the pressure block 89 to apply a vertically upward force on the inner surface of the tube or the gun barrel. The spring loading of the toggle mechanism will produce a substantially constant force on the jam block and will compensate for small variations of internal diameter of the tube or the gun barrel. Also, since the pressure block 89 is midway between the jam block 49 and the fulcrum block 123, the upward force of the pressure block will be equal to twice the downward force of the jam block. Furthermore, the weight of the extension control tube will provide an additional force about the fulcrum which will further increase the force of the pressure block against the tube or the barrel. By selecting suitable blocks, the tilting of the main frame may be reduced to a minimum and the position of the penetrator relative to the surface tested will remain approximately perpendicular.

Continuing with the description of the operation of the device, with the oscillator switch 231 in the "off" position (the blades centered between contacts), the potentiometer 216 should be adjusted until the pointer of output balance meter 215 is aligned with the zero mark on the meter scale, thus indicating balance. The oscillator switch may then be placed in the lower position, which will provide voltage at optimum value and frequency for operating the linear variable differential transformers 57 and 186 forming part of the electromechanical servo system for measuring and indicating the penetrator loading. This will cause the output balance meter 215 to indicate an unbalance, and the knob 181 on the load measuring and indicating dial should be turned until the ouput balance meter is again balanced. The zero line on load measuring and indicating dial 179 is then aligned with its pointer 195 by holding the knob stationary while turning the outer drum 174. Particular care must be taken to prevent turning of the knob to avoid changing the output balance of the linear variable differential transformers as indicated on the output balance meter. Immediately thereafter the knob should be turned until the "Set" mark on the load measuring and indicating dial representing the minor loading, is aligned with its pointer, which will produce an unbalanced voltage between the linear variable differential transformers 57 and 186 as indicated on the output balance meter 215. By placing the motor control switch 221 in the position marked "Down" the motor will be energized and the penetrator load member assembly will be gradually moved downward toward the surface being tested; also, the indicating lamp 222 will signify that the penetrator is not in its maximum upper position in the main frame. As soon as the penetrator comes in contact with the surface of the tube or gun barrel, the pointer of the output balance meter 215 will begin to move toward its zero center; at this time a push-button switch 236 should be depressed, which will insert a resistance 237 in the motor circuit and thus reduce the speed of the motor. This will facilitate balancing of the output balance meter 215 without exceeding the zero line on the meter dial.

Thereafter, the oscillator switch 231 should be placed in its upper position (illustrated in Fig. 21) which will provide voltage at optimum value and frequency for operating the transmitter 93 and receiver 206 forming part of the means for measuring the depth of penetration, or hardness of the surface being tested. The knob 211 on the hardness measuring and indicating dial then is turned until the output balance meter 215 is once again balanced. The zero line on the hardness measuring and indicating dial is then aligned with its pointer by holding the knob 211 and turning the outer drum, making sure that the knob does not turn to avoid disturbing the ouput balance of the transmitter and receiver.

The oscillator switch 231 is again placed in its lower position and the knob 181 is turned until the desired scale mark on the load measuring and indicating dial, (A, B, or C representing the major loading), is aligned with its pointer. This will cause the output balance meter to indicate unbalance.

The motor control lever switch 221 should then be placed in the position marked "Down" which will energize the motor 122, thus causing an increased force to be applied to the penetrator load member and the penetrator. As soon as the pointer of the output balance meter begins to move toward its zero center, the push-button switch 236 should again be depressed to decrease the speed of the motor, and the output balance meter carefully and accurately balanced without exceeding the zero line on the meter dial. (If the zero line is exceeded, the hardness reading will be too low; and conversely, if the zeroing is incomplete, the hardness reading will be too high.) If, however, the zero line is greatly exceeded for the C Scale setting of the load measuring and indicating dial, that setting being the maximum normal loading that should be applied to the penetrator load member assembly, the limit switch 65 on the load member spring will be closed and the motor circuit will be opened, as will be indicated by the lighting of the indicating lamp 224. In that event, the motor may be reversed by placing the motor control switch 221 in the position marked "Up" to move the penetrator to its raised position. After the major loading has been applied, the knob 181 is turned in the opposite direction until the "Set" mark on the load measuring and indicating dial is again aligned with its pointer. The motor control switch 221 may then be placed in the position marked "Up," reversing the motor, and thereby gradually removing the major penetrator loading. When the pointer of the output balance meter begins to move toward its zero center, the push-button switch 236 should be depressed to decrease the speed of the motor, and the output balance meter should be carefully and accurately balanced. (If the zero line is exceeded, the motor may be reversed and a second trial may be made to balance the ouput balance meter, without impairing the accuracy of the hardness reading.)

The oscillator switch 231 should then be placed in the upper position, and knob 211 on the hardness measuring and indicating dial turned until the output balance meter is balanced. The hardness number of the tube or gun barrel being tested may then be read on one of the scales on the hardness measuring and indicating dial. The scale to be read will depend upon the loading and the kind of penetrator used in making the hardness test.

After the reading has been made, the oscillator switch 231 is placed in the "off" position and the motor control lever switch 221 is placed in the position marked "Up," which will cause the penetrator to be removed from the surface of the tube or gun barrel being tested. When the penetrator is at its maximum upper position the motor circuit will be opened and the indicating lamp 222 will light. Thereafter it will be possible to deenergize the coil of the electromagnet by depressing the push-button switch 223, thereby releasing the holding mechanism which will be indicated by the lighting of lamp 229. The main frame may then be withdrawn from the tube or the barrel and other tests may be performed as desired.

Although I have submitted one specific embodiment of my invention for illustrative purposes, it is to be understood that the invention is not limited to the specific mechanical and electrical details described, for numerous modifications within its spirit will readily occur to one skilled in the art to which it pertains. Therefore, it is my intention that the limits of the invention be defined only by the appended claims.

Having thus disclosed my invention, what I claim as new and desire to secure by Letters Patent of the United States is:

1. Apparatus for testing the hardness of internal surfaces comprising a frame, a jam block carried by the frame and movable out of the frame to bear against an internal surface to be tested, a toggle controlling the position of the jam block, an eltromagnet for actuating the toggle, a penetrator carried by said frame, motor-actuated means for loading said penetrator to indent the surface to be tested, and means responsive to movement of the last-named means for measuring a load applied and the resulting indentation.

2. Apparatus as defined in claim 1 further characterized by an extension control tube fastened to the end of said frame for inserting and orienting the penetrating with respect to a particular internal surface to be tested.

3. In apparatus for testing the hardness of internal surfaces including a main frame, a movable penetrator mounted on a side of said frame, means for loading the penetrator to indent the surface to be tested, and means for measuring the load applied to the penetrator and the depth of penetration; retaining means for said frame comprising a fulcrum block mounted on one end of said frame on the side of said penetrator, a movable jam block mounted on the other end of said frame on the side of said penetrator; and a pressure block mounted on said frame directly opposite to the penetrator.

4. A device as defined in claim 3 further characterized by a toggle mechanism within said frame for moving said jam block, and an electromagnet contained within said frame for actuating said toggle mechanism.

5. Apparatus as defined in claim 4 further characterized by a manually operated safety means connected to said toggle for overcoming the effect of the electromagnet by forcibly moving the jam block.

6. In apparatus for testing the hardness of internal surfaces including a main frame, a movable penetrator mounted on the lower side of the frame, loading means for moving the penetrator downwardly to indent the surface to be tested, and means for measuring the load applied to the penetrator and the depth of penetration; means for holding the frame adjacent the surface to be tested comprising a fulcrum block mounted in one end of the lower side of the frame, a pressure block mounted on the upper side of the frame opposite the penetrator, a movable jam block mounted on the other end of the lower side of the frame for lifting the frame against the pressure block, and an extension tube mounted on the end of the frame carrying the fulcrum block.

7. Hardness testing apparatus comprising a frame, a movable penetrator mounted on said frame, loading means for said penetrator adapted to cause said penetrator to indent a surface to be tested; first measuring means including a pair of differential transformers each having a movable magnetic core, a primary winding and two secondary windings arranged in coaxial relationship whereby movement of said core will vary the mutual inductance between the primary and each secondary winding; one of the cores of one of said transformers being mechanically connected to the loading means indicating means remote from the frame and connected to the magnetic core of the other of said transformers, a source of alternating current connected to the primary windings of both of said transformers, each transformer having the said secondary windings connected in series opposition, and means interconnecting the secondaries of the two transformers so that the net induced voltages across said secondaries will be equal and opposite when the magnetic cores of the said transformers are in the same relative position with respect to their primary and secondary windings; said measuring means being responsive to the movement of the loading means for measuring the load applied to the penetrator; a second measuring means including a transmitter mounted on the frame and controlled by the loading means, a receiver electrically connected to the transmitter, and a voltmeter electrically connected to the transmitter and receiver for indicating the sum of the output voltage thereof.

8. Apparatus defined in claim 7 further characterized by an oscillator and an oscillator amplifier electrically connected to the transmitter and the receiver for supplying electrical energy thereto, and a signal amplifier connected to the transmitter and the receiver for amplifying their output voltages.

9. Apparatus as defined in claim 7 further characterized by an oscillator and an oscillator amplifier electrically connected to both the first and second measuring means for supplying electrical energy thereto, and a signal amplifier connected to each of the measuring means for amplifying their output voltages.

10. Apparatus for testing the hardness of interior surfaces of tubular bodies, comprising a cylindrical frame, a penetrator mounted for movement radially in and out of said frame, a motor and gears for driving said penetrator, means for securing the frame in position within a tubular body, electro-mechanical means for generating and transmitting one signal responsive to the extent of movement of the penetrator and another signal responsive to the load applied to the penetrator, and means remote from the frame for receiving said signals and indicating the values thereof.

11. Apparatus for testing the hardness of interior surfaces of tubular bodies, comprising an elongated frame small enough to fit within a tubular body, means for securing the frame within the body, a penetrator, a resilient member connected to the penetrator, an electro-mechanical transducer connected to said resilient member and responsive to the movement thereof, a motor mounted in said frame, a train of gears driven by said motor and driving said penetrator, an electro-mechanical transducer connected to one of the gears and responsive to the movement thereof, and means remote from the frame and connected to said transducers for receiving signals therefrom and indicating their values.

12. A hardness tester comprising a cylindrical frame, blocks mounted for radial movement at the surface of said frame, mechanism for operating said blocks, electrically controlled means for operating said mechanism, a penetrator mounted for movement in and out of said frame, motor driven means for operating said penetrator, and a circuit interconnecting the supply to the motor and said electrically controlled means for locking the blocks in extended position when the penetrator is extended.

13. A hardness tester comprising a frame, a penetrator mounted for movement in and out of said frame, motor driven means for moving the penetrator, a circuit including a limit switch for stopping the motor at the extreme inner position of the penetrator, resilient means interposed in the means for moving the penetrator, a circuit including a limit switch mounted for actuation by said resilient means for stopping the motor as the resilient means deflect in response to the imposition of a predetermined load on the penetrator, electro-mechanical means for generating and transmitting a signal responsive to the extent of deflection of said resilient means, and means for receiving said signal and indicating the value thereof.

14. Apparatus for testing the hardness of interior surfaces of tubular bodies, comprising a cylindrical frame, means for securing the frame in position within a tubular body, a penetrator mounted for movement radially in and out of said frame, a resilient member connected to the penetrator, an electro-mechanical transducer connected to said resilient member and responsive to the deflection thereof, a motor driven train of gears driving said penetrator, an electro-mechanical transducer connected to said train of gears and responsive to the movement thereof, and means remote from the frame and connected to said transducers for receiving signals therefrom and indicating their values.

15. Apparatus for testing the hardness of interior surfaces of tubular bodies comprising a cylindrical frame, means for securing the frame in position within a tubular body, a penetrator mounted for movement radially in and out of said frame, a resilient member connected to the penetrator, loading means for exerting pressure on the penetrator to move it, a first electro-mechanical transducer connected to the loading means and responsive to the extent of movement thereof, a second electro-mechanical transducer connected to said resilient member and responsive to the deflection thereof, and means remote from the frame for receiving signals from said first and second transducers and indicating the values thereof.

References Cited in the file of this patent

UNITED STATES PATENTS

| | | |
|---|---|---|
| 1,770,046 | Shore | July 8, 1930 |
| 2,258,424 | Smith | Oct. 7, 1941 |
| 2,466,567 | Williams | Apr. 5, 1949 |
| 2,544,205 | Williams | Mar. 6, 1951 |
| 2,631,272 | Smith | Mar. 10, 1953 |
| 2,671,203 | Griffin | Mar. 2, 1954 |
| 2,677,271 | Faris et al. | May 4, 1954 |

FOREIGN PATENTS

| | | |
|---|---|---|
| 618,470 | Germany | Sept. 9, 1935 |
| 845,425 | Germany | July 31, 1952 |
| 431,855 | Italy | Mar. 8, 1948 |
| 704,290 | Great Britain | Feb. 17, 1954 |

U. S. DEPARTMENT OF COMMERCE
PATENT OFFICE

CERTIFICATE OF CORRECTION

Patent No. 2,835,127      Robert C. Scott      May 20, 1958

It is hereby certified that error appears in the printed specification of the above numbered patent requiring correction and that the said Letters Patent should read as corrected below.

Column 6, line 24, for "porjects" read -- projects --; column 7, line 32, after "line" insert -- of --; line 50, for "tested" read -- tester --; line 56, after "138" insert -- which --; column 11, line 10, for "of", first occurrence, read -- or --; column 16, line 19, before "is" insert -- again --; line 52, for "eltromagnet" read -- electromagnet --; line 61, for "penetrating" read -- penetrator --.

Signed and sealed this 12th day of August 1958.

(SEAL)

Attest:
KARL H. AXLINE
Attesting Officer

ROBERT C. WATSON
Commissioner of Patents